May 25, 1965  H. T. GREEN ET AL  3,185,135
FOUNTAIN PEN
Filed Dec. 7, 1960  4 Sheets-Sheet 1
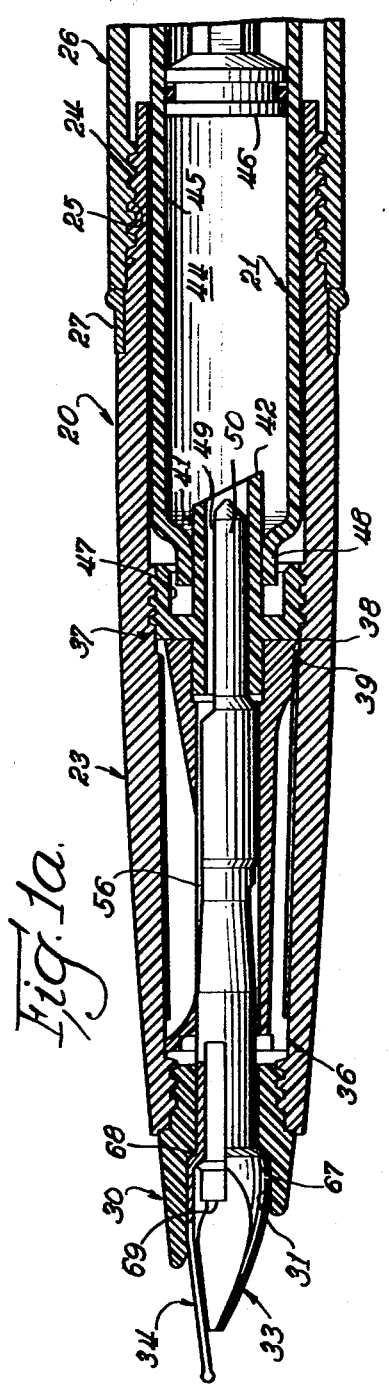
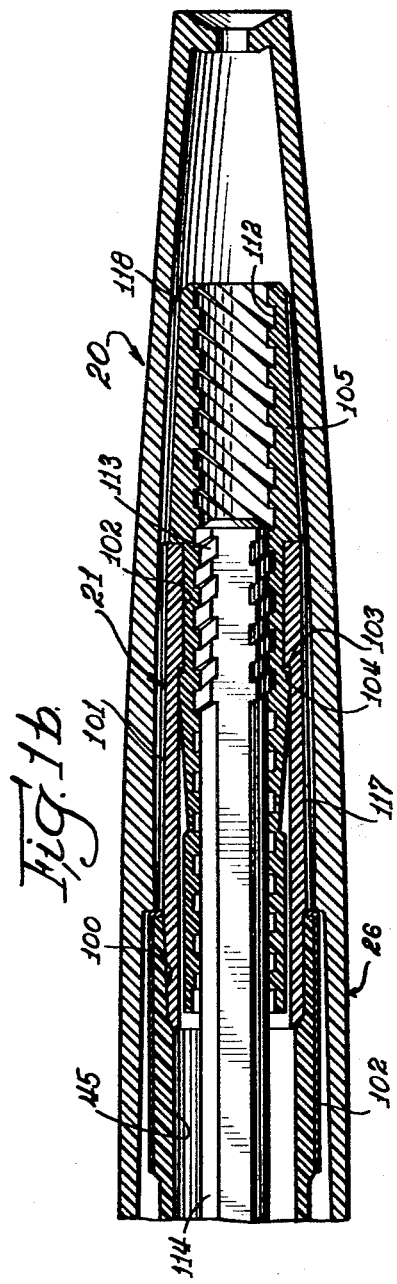
INVENTORS
Homer T. Green
Ray A. Lawton
BY
Fidler, Beardsley & Bradley
ATTYS.

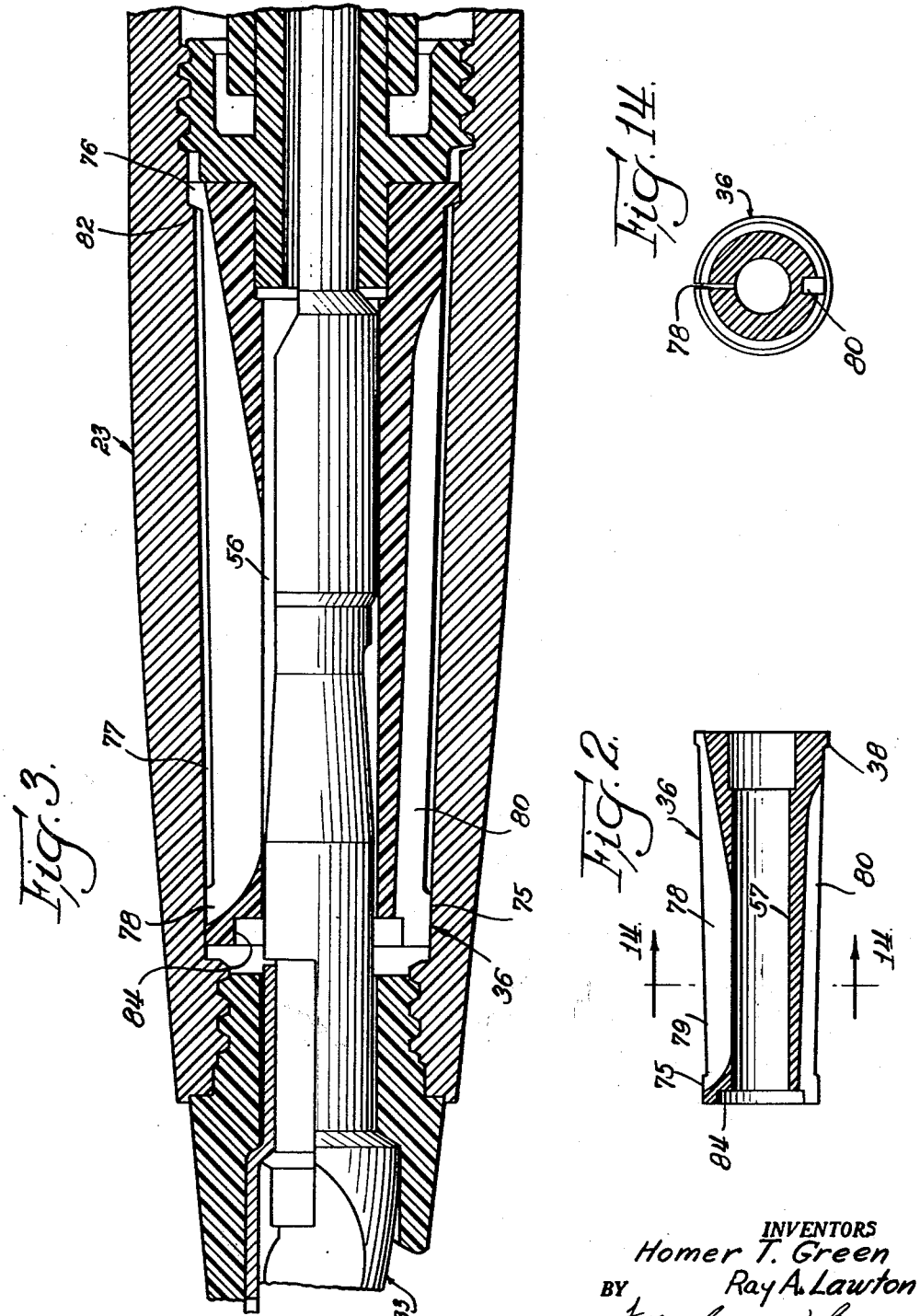

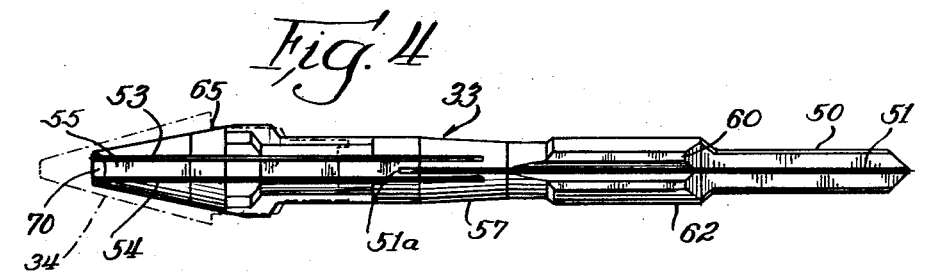
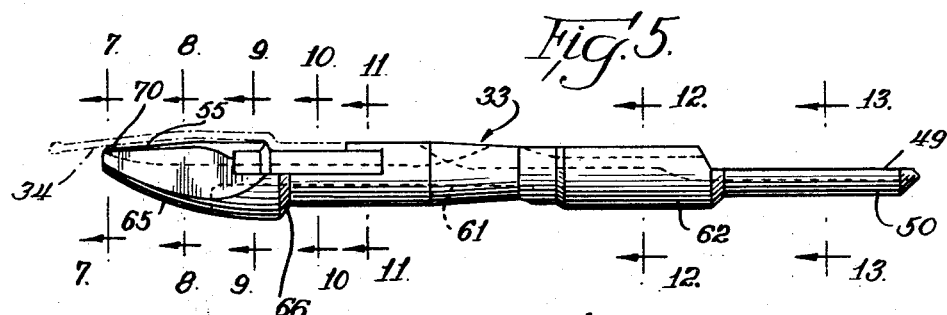
   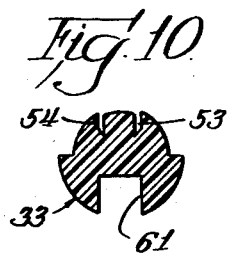
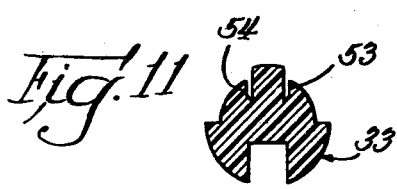 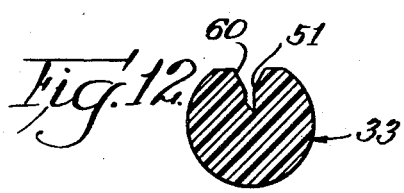
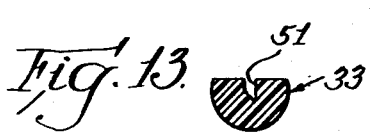

May 25, 1965  H. T. GREEN ET AL  3,185,135
FOUNTAIN PEN
Filed Dec. 7, 1960  4 Sheets-Sheet 4
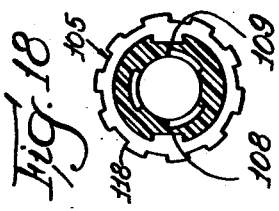
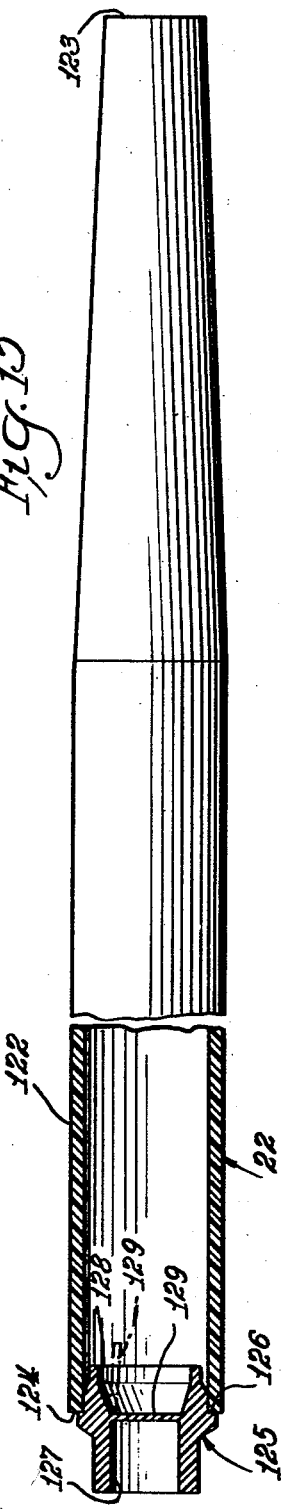
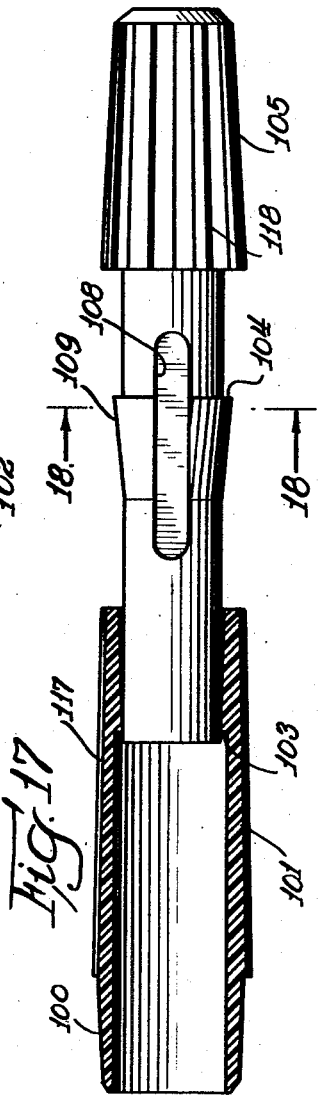
INVENTORS
Homer T. Green
Ray A. Lawton
BY
ATTYS.

United States Patent Office 3,185,135
Patented May 25, 1965

3,185,135
FOUNTAIN PEN
Homer T. Green and Ray A. Lawton, Milton, Wis., assignors to The Parker Pen Company, Janesville, Wis., a corporation of Wisconsin
Filed Dec. 7, 1960, Ser. No. 74,289
6 Claims. (Cl. 120—50)

The present invention relates to fountain pens and it more particularly relates to a new and improved means for inhibiting the leakage of ink from a fountain pen when the differential pressure between the ink reservoir and the atmosphere varies.

During normal writing conditions the internal forces acting to force ink out of the pen are exactly balanced by those forces tending to retain the ink within the pen. Accordingly, only that ink which is pulled out of the pen by the capillary attraction of the ink to the capillary space between the nib and the paper leaves the pen. These balanced forces include, among others, the force exerted on the ink by atmospheric pressure to force the ink into the pen and more particularly into the reservoir and the force exerted by the air pressure within the reservoir behind the ink acting in the opposite direction. If the air pressure in the reservoir increases relative to atmospheric pressure as, for example, if the atmospheric pressure is reduced or if the temperature of the air in the reservoir is increased as is commonly caused by holding the pen in the hand, then the forces are unbalanced in the direction to cause ink to flow from the reservoir.

In accordance with the teachings of the prior art, this ink which thus flows out of the reservoir is fed to an overflow collector chamber rather than being leaked out of the pen. The prior art types of overflow collector arrangements operate satisfactorily for this purpose but in many cases are relatively complex thereby being expensive to manufacture and assemble and in other cases are relatively simple in construction but not entirely satisfactory in operation.

Therefore, a principal object of the present invention is to provide new and improved means for inhibiting the leakage of ink from the fountain pen.

Another object of the present invention is to provide a new and improved ink feed control mechanism including a novel ink collector.

A further object of the present invention is to provide a new and improved ink collector apparatus which is fast acting thereby minimizing the conditions under which leakage may occur.

Briefly, the above and further objects are realized in accordance with the present invention by providing an ink feed and control system including a single weir which is preferably annular in shape and which is formed by a generally cylindrical and symmetrical collector plug in which a feed bar is disposed. A slot of capillary dimension connects the weir to an annular collector chamber formed between the external envelope of the collector plug and the collector shell or barrel of the pen. The dimension of this slot is selected relative to the dimensions of the weir and the feed passageways in the feed bar such that ink cannot be drawn out of the slot during writing. Moreover, an infinite capillary between the slot and the annular collector chamber is assured by the configuration of the collector plug and the collector shell so that the annular collector chamber is wetted at all times following the first time an overflow condition occurs forcing ink into the collector chamber. Of course, if the pen is not used for long periods of time the ink in the infinite capillary may dry out but if such is the case tiny particles of residue are left on the walls at this location providing extremely small capillary passages which act quickly to transfer ink from the feed slot to the overflow chamber should an overflow condition occur.

Further objects and advantages and a better understanding of the present invention may be had from the following detailed description taken in connection with the accompanying drawings wherein:

FIGS. 1a and 1b are cross-sectional views which when arranged with FIG. 1b, in engagement with the right-hand end of FIG. 1a, show a complete fountain pen embodying the present invention;

FIG. 2 is a longitudinal sectional view of a collector plug;

FIG. 3 is a greatly enlarged cross-sectional view of the feed control and overflow collector mechanism of the present invention;

FIG. 4 is a top view of a feed bar;

FIG. 5 is a side view of the feed bar of FIG. 4;

FIG. 6 is a bottom view of the feed bar of FIG. 4;

FIGS. 7–13 are cross-sectional views, respectively, taken along the lines 7–13 in FIG. 5;

FIG. 14 is a cross-sectional view taken along the line 14—14 in FIG. 2;

FIG. 15 is a partially sectioned, fragmentary view of a replaceable ink cartridge;

FIG. 16 is a longitudinal sectional view of a refillable ink reservoir;

FIG. 17 is a greatly enlarged partially in section, exploded view of a portion of the reservoir of FIG. 16; and FIG. 18 is a sectional view taken along the lines 18—18 in FIG. 17.

Referring now to the drawings and particularly to FIGS. 1a and 1b thereof, there is shown a complete fountain pen 20, the lower or forward portion being shown in section in FIG. 1a and the upper or rearward portion being shown in section in FIG. 1b. As illustrated in FIGS. 1a and 1b the pen 20 includes a refillable ink reservoir 21 of the piston and cylinder type, but it should be understood that because of its versatility, the pen 20 may employ a replaceable throw-away type of ink reservoir or cartridge 22 shown in FIG. 15 and described more fully hereinafter. Each of the reservoirs 21 and 22 have advantages which make it particularly suited for certain applications, but less suitable for other applications. For example, the replaceable cartridge 22 makes it extremely easy to quickly replenish the ink supply of the pen by merely replacing the spent cartridge. On the other hand, the cost of the ink used in the refillable reservoir 21 is substantially less than the cost of ink purchased in the separate cartridges 22. Since the pen 20 can be used with both types of reservoir, it has the advantage of versatility to the user while enabling the manufacturer of the pen to use the identical parts and assembly lines for making two basically different types of pens.

The pen comprises a collector shell 23 having an externally threaded rear end portion 24 which co-acts with an internally threaded forward end portion 25 on a barrel member 26. Preferably the collector shell 23 and the barrel 26 are formed of any of the many suitable plastics used for this purpose. A metallic collar 27 is press-fitted onto the collector shell 23 to provide a stop against which the barrel 26 abuts when the barrel parts 23 and 26 are connected together. The threaded connection between the collector shell 23 and the barrel 26 enables ready disassembly of the two parts in order to refill the reservoir 21 or to replace the cartridge type reservoir 22.

An important feature of the pen 20 of the present invention is the fact that it consists of relatively few component parts, thus minimizing the inventory both of the manufacturer and those who provide maintenance for the pen. Moreover, the pen is easily disassembled thereby further facilitating repair and maintenance of the pen.

As shown in FIGS. 1a and 1b, the operating mechanism or ink feeding and writing portion of the pen 20 comprises a nib collar 30, preferably molded of a suitable plastic, which is threadedly mounted in the forward end of the collector shell 23. The nib collar 30 includes an axial bore 31 in which a feed bar 33 and a writing nib 34 are mounted. As will be understood more clearly as the present description proceeds, the nib collar 30 provides the sole support for the feed bar 33 and the nib 34, thereby facilitating inspection, cleaning and replacement of the nib 34 and the feed bar 33.

A generally cylindrical collector plug 36, better shown in FIG. 2, loosely fits over the rearwardly extending portion of the feed bar 33 and is held at a predetermined location within the collector shell 23 by means of a nipple 37 which is threadedly received within the bore of the collector shell 23. The nipple 37 engages the rear end of the collector plug 36 and forces a forwardly facing annular shoulder 38 thereon against a rearwardly facing annular shoulder 39 in the bore of the collector shell 23. It is important that the shoulders 38 and 39 be in abutment, and for this reason it will be noted that the forward end of the collector 36 does not seat on any portion of the shell 23 but is free to move axially therein.

In addition to locating the collector 36 in the collector shell 23, the nipple 37 also functions to mount the reservoir 21 in the pen and to couple the reservoir 21 to the feed bar 33. Consequently, the nipple 37 includes a centrally disposed, longitudinally extending tubular portion 41 having the rearward end 42 cut on a bias to provide a sharp, knife-like end for severing a portion of the replaceable cartridge reservoir 22 as described hereinafter in connection with FIG. 15.

The refillable reservoir 21 includes an ink supply or storage chamber 44 defined by a hollow cylinder 45 and a piston type plunger 46 which is axially movable within the bore of the cylinder 45 to fill the chamber 44. The cylinder 45 is slightly resilient and includes an open forward end of reduced diameter forming a collar 48 which fits snugly over the rearwardly extending portion of the tube 41 and partly into an annular recess 47 in the nipple 37 to effect an hermetic seal between the nipple 37 and the reservoir 21. Ink flowing out of the chamber 44 and replacement air flowing into the chamber 44 thus respectively passes through the nipple 37 and through suitable passageways provided in the feed mechanism to and from the front end of the pen.

In order to provide a continuous supply of ink to the nib 34, the feed bar 33 extends into the chamber 44 whereby it is immersed in the ink in the chamber 44. The rear feed bar portion 50 is loosely received in the bore of the nipple 37, and extends to a location in proximity to the rearward end of the tube 41 so as to be bathed by the ink in the chamber 44. As best shown in FIGS. 4 and 5 the rear portion 50 of the feed bar 33 is semi-cylindrical having a flat longitudinally extending surface 49 provided with a capillary feed groove 51. As best shown in FIG. 13, the feed groove 51 has a generally V-shaped bottom providing an infinite capillary passageway along the feed groove 51. Because of the capillary attraction between the ink in the chamber 44 and the infinite capillary at the bottom of the feed groove 51 the groove 50 remains at least partially filled with ink as long as a supply of ink is contained within the chamber 44.

One necessary characteristic of any commercially satisfactory present day fountain pen is that it be substantially immune to leakage. One factor which may lead to leakage in a fountain pen is rapid and sudden axial movements of the pen. When such movement occurs, the natural inertia of the liquid in the pen tends to move it towards the nib and since the nib can only hold a small amount of ink, the ink thus moved to the nib will flow out of the pen. In the past, various arrangements and structures have been employed to prevent leakage under such conditions. For the most part such arrangements have been rather complex. An important feature of the pen 20 embodying the present invention is the simplicity of the mechanism employed for preventing such leakage.

The feed groove 51, which is straight and which extends axially of the pen substantially along the principal longitudinal axis thereof, terminates abruptly at the location 51a (FIG. 4), and a pair of feed grooves 53 and 54, which also extend axially of the pen 20 and therefore lie parallel to the feed groove 51, feed the ink from the groove 51 to the nib 34. The grooves 53 and 54 are entirely of capillary width and are, therefore, smaller in cross-sectional area than the groove 51. Accordingly, two such grooves are employed to insure that a sufficient amount of ink is supplied to the nib 34. The feed grooves 53 and 54, which, as shown in FIGS. 8, 9, 10 and 11, are each provided with a V-shaped bottom portion to provide an infinite capillary feed groove which insures a continuous flow of ink from the ink chamber 44 to the nib 34. The grooves 53 and 54 are displaced from but overlap with the forward portion of the feed groove 51 and all three of these grooves are connected together by means of an annular weir chamber 56 of capillary dimension located between the bore 57 in the collector 36 and the intermediate portion 57 of the feed bar 33. The feed passage is, therefore, discontinuous and ink is prevented from being shaken directly from the feed groove 51 to the nib 34 by virtue of the fact that in order for ink to travel from the groove 51 to the nib 34 it must first travel in a transverse direction through the annular chamber 56 and there is ordinarily no appreciable force component in the transverse direction to cause such movement.

In addition to connecting the feed grooves 53 and 54 with the feed groove 51 in order to inhibit leakage of ink from the pen, the chamber 56 also provides the sole weir which allows air to bubble through the ink and into the chamber 44 to substantially equalize the chamber pressure with that of the atmosphere. The feed groove 51 has an enlarged upper end 60 (FIG. 12) at the location of an enlargement 62. The enlargement 62 locates the feed bar 33 in the collector plug 36 and the widened portion 60 of the feed groove enables air to flow back into the chamber 44 without shutting off the supply of ink to the nib 34. In the absence of a weir, as the ink in the pen was used a vacuum would be built up in the chamber 44 until the pressure differential between the atmosphere and that in the chamber became sufficiently great to prevent the further flow of ink out of the chamber 44. Accordingly, the nib would be starved and the pen would appear to be dry even though a substantial amount of ink was contained within the chamber 44. In the same regard, air is supplied to the annular weiring chamber 56 for the aforementioned reason via an air feed channel 61, best shown in FIGS. 6, 9 and 11, provided in the bottom of the feed bar 36. Although the channel 61 opens into the weir chamber 56, the channel 61 is sufficiently large that ink will not flow into it and thus does not flow out of the pen through the channel 61.

The slot 78 and the infinite capillary 82, hereinafter described normally have ink in them but the fluid pressure is such that ink cannot be drawn into the collector chamber 77 by capillary forces. As understood by those skilled in the art an infinite capillary is used herein for the purpose of defining a capillary space bounded by a material wettable by the liquid with which it is adapted to be used and having a capillary dimension which is of sufficiently small size that the capillary force of attraction exerted on the associated liquid is infinite. An infinite capillary is thus formed at the juncture of two plane surfaces which meet at an angle of 90 degrees or less. A leak condition occurs when the external, or atmospheric pressure is reduced with respect to the air pressure in the reservoir 44. This in turn results in a decrease in the fluid pressure at the infinite capillary 82 which permits the opposing capillary force available in the collector chamber 77 to draw ink from the reservoir. As ink is drawn from the reservoir 44, the pressure difference between that in the reservoir and external pressure is decreased. As this pressure differential decreases the pressure opposing the capillary forces of the collector chamber 77 increases until equilibrium occurs and there is no further movement of the ink in the chamber 77.

The capillary force exerted by collector chamber 77 is ordinarily less than that of the weiring chamber 56 consequently, upon drawing ink from the pen as in writing, ink will be written out of the collector chamber 77 before a bubble of air is able to enter through the weiring chamber 56.

In order to locate the feed bar 33 in the nib collar 30, a rearwardly facing shoulder 66 on the bottom portion of the feed bar 33 abuts against the lower portion of an annular rabbet 67 in the nib collar 30. The upper surface of the forward portion of the feed bar 33, herein designated 65, conforms to the inner or lower surface of the writing nib 34 to provide a large area capillary connection between the feed grooves 53 and 54 and the writing nib 34 which insures a plentiful supply of ink for the nib. The nib 34 is located in the collar 30 by means of its rearwardly facing shoulder 68 which abuts against the upper part of the shoulder 67 when the nib and feed bar assembly is disposed in the nib collar 30. As best shown in FIG. 1a, the nib 34 is offset to provide the shoulder 68 and a shoulder 69 which locates the nib 34 on the feed bar 33. The nib 34 and the feed bar 33 are together press-fitted into the nib collar 30 to provide a tight fit between the nib 34 and the feed bar 33 and thereby to hold the nib 34 in place in the pen 20.

As best shown in FIG. 7 the lower portions of the feed grooves 53 and 54 which underlie the nib 34 are not provided with an infinite capillary at the bottom as are the remaining portions of the grooves 53 and 54 so that the ink which is fed to the nib 34 is pulled out of the feed grooves 53 and 54 by the greater capillarity provided between the nib 34 and the adjoining surface of the feed bar 33.

It is important that a large area capillary connection be provided between the feed grooves 53 and 54 and the nib 34 in order to maintain a plentiful supply of ink at the nib 34. Although a capillary passage of sufficient area can be provided between the nib and the feed bar by maintaining close tolerances on both the nib and feed bar dimensions, the cost of manufacturing the feed bar 33 can be greatly reduced if it is molded in its final condition rather than first molded and later machined. Therefore, in accordance with an important feature of the present invention the feed bar 33 is molded of plastic with a protuberance 70 on the upper surface of the forward end thereof. The height of the protuberance 70 is such that when the nib 34 is placed on the feed bar 33 and pressed into the collar 30, the nib 34 is stressed and deformed upwardly as shown in FIG. 5. By its very nature, the nib 34, which is preferably made of gold, is resilient, this as well known in the prior art, being a desirable if not a necessary attribute of a writing nib.

In order to cause the adjoining surface of the feed bar 33 to conform to the surface of the nib 34, the end of the feed bar 33 with the nib and collar assembled thereto is heated by suitable means as, for example, by dipping it in hot water to soften the end of the feed bar 33 which may be, for example, formed of methyl methacrylate. When the protuberance 70 softens, the pressure exerted thereon by the nib 34 forms the protuberance 70 into the complementary of the bottom surface of the nib 34. An extremely close fit is thus provided between the nib 30 and the adjacent part of the feed bar 34 to insure a passageway of capillary dimension between the feed channels 53 and 54 and the nib 30.

Another condition which commonly arises and which tends to cause ink to leak from a fountain pen is a relatively rapid drop in the atmospheric or ambient pressure. This causes the pressure in the ink chamber 44 to exceed the pressure outside the pen which thus tends to force ink out of the chamber 44 until the internal and external pressures on the ink are equalized. In the prior art, it is known to provide an overflow or collector chamber for temporarily storing the ink which is thus forced out of the chamber 44. Ink is thus prevented from flowing directly out of the pen. In the pen 20 of the present invention, an overflow or collector chamber is also provided for this same purpose. But the structure which provides this chamber is simpler than that provided in the prior art while operating both effectively and rapidly.

Referring now particularly to FIGS. 2 and 3, the collector plug 36 is provided with a forwardly disposed flange 75, which centers the forward end of the collector plug 36 within the shell 23, and a rearwardly disposed flange 76 which provides the forwardly facing shoulder 38 for accurately locating the plug 36 within the collector shell 23. An annular area 79 of reduced external diameter is thus provided between the flanges 75 and 76 and co-acts with the bore of the collector shell 23 to provide an annular collector or overflow chamber 77 which becomes narrower towards the rear of the pen. When an overflow condition occurs, the collector or overflow chamber 77 is fed with ink by means of a capillary slot 78 which is connected to the weiring chamber 56. The slot 78 has a width of capillary dimension so as to exert a force on the ink tending to draw it out of the weiring chamber 56 into the slot 78. The collector chamber 77 is connected to the atmosphere by means of a slot 80 which is disposed diametrically opposite to the slot 78 but which, unlike the slot 78, continues through the forward flange 75 and is thus connected to the atmosphere by way of the channel 61. While the slot 78 is of capillary dimension having a width of approximately .005 inch, the slot 80 is much wider having a width of approximately .030 so that the slot 80 does not have capillary dimensions and therefore ink cannot normally flow out of the pen from the collector reservoir 77 through the slot 80.

During normal operation of the pen when an overflow condition does not exist, the atmospheric pressure exerted on the ink in the weir 56 is equal to the sum of the opposite forces tending to drive the ink in the opposite direction. These latter forces are the force of capillary attraction attempting to pull the ink into the slot 78, and the force exerted on the ink by the pressure within the ink chamber 44 when these two opposite forces are equal, the ink remains stationary in the pen, but when the atmospheric pressure becomes less than the sum of the chamber pressure and the capillary pressure, ink moves up into the slot 78 and collector chamber 77 and out of the ink chamber 44 thereby lowering the pressure within the chamber 44. This movement of ink continues until the internal and external forces on the ink are again equalized. The slot 78 necessarily has a very small volume and once it has been filled, the ink which is being forced out of the chamber 44 flows into the substantially large collector chamber 7.

In order to insure that the ink from the filled slot 78 rapidly transfers to the larger overflow chamber 77, there is provided in accordance with the present invention an infinite capillary 82 at the rear end of the overflow chamber 77 in direct contact with the slot 78. As shown, the infinite capillary 82 is disposed at the junction between the flange 76 and the shell 23. Inasmuch as the abutting shoulders 38 and 39 on the collector 36 and on the collector shell 23 provide the sole axial locating means for the plug 36, a tight fit between the collector plug 36 and the collector shell 23 at the desired location of the infinite capillary 82 is assured. Once an overflow condition has occurred and ink has flowed from the slot 78 into the chamber 77, the infinite capillary 82 causes a small amount of ink to remain in the infinite capillary 82 even after the overflow condition has ended and all of the ink has effectively flowed from the chamber 77 and the slot 78 back into the weir 56. The collector chamber 77 thus remains wetted at the point of juncture with the slot 78 so that a rapid transfer of ink from the slot 78 to the large chamber 77 will occur when an overflow condition next exists. Without the infinite capillary connection 82, this transition might be sufficiently retarded that the pressure would equalize itself by causing ink to flow past the slot 78 to the front of the nib and hence leak from the pen.

As noted hereinbefore, an important feature of the pen of the present invention is that the collector plug 36 has no required angular orientation within the collector shell 23 or with respect to the feed bar 33. To this end, and to minimize the tolerances which must be maintained on the various dimensions of the plug 36, which is preferably molded of plastic, the forward end of the plug 36 is provided with a counter bore 84 which communicates with the slot 80 and which serves to insure the free passage of air from the channel 61 in the feed bar 33 to the slot 80 irrespective of the relative angular positions of the feed bar 33 and the collector 36.

Refer now to FIG. 16 for a more detailed description of the refillable ink reservoir 21. As described hereinbefore in connection with FIG. 1a, the reservoir 21 comprises a hollow cylinder 45 forming the ink chamber 44. Preferably the cylinder 45 is formed of a transparent material so that when the barrel 26 is removed from the collector shell 23 the amount of ink in the chamber 44 may be determined merely by looking at the level of ink in the cylinder 45. The rearward end of the cylinder 45 has a tapered counter bore 100 into which a tubular shell 101, also formed of plastic, is inserted and secured thereto by suitable means such, for example, as spin welding. A metallic band 102 surrounds the rear end of the cylinder 45 to facilitate handling of the reservoir 21 and for improving the general appearance thereof.

The shell 101 has an internally extending annular flange 102a at the rearward end thereof providing a forwardly facing shoulder 103 against which a complementary shoulder 104 on a rotary feed member 105 abuts. As best shown in FIG. 17, the feed member 105 is provided with a pair of longitudinally disposed slots 108 which provide relatively weak areas which permit temporary deformation of the member 105 during assembly of the reservoir 21 when the forward end of the feed member 105 is inserted into the rearward end of the feed shell 101. As shown, the shoulder 104 is the rearward termination of an outwardly flared, annular portion 109 which serves as a wedge to compress the member 105 in the vicinity of the slots 108 as the feed member 105 is inserted into the shell 101. Once, however, the shoulder 104 passes beyond the shoulder 103, the natural resiliency of the feed member 105 causes the flared portion 109 to spring outwardly thereby to permanently lock the member 105 in place while permitting relative rotation between the feed member 105 and the shell 101. As shown, the feed member 105 is provided with an internal square thread 112 extending throughout the length thereof which mates with an external thread 113 on a rearwardly extending arm 114 of the piston 46. The arm 114 is rectangular in cross-section to minimize the friction between the piston 46 and the feed member 105 thereby facilitating the filling of the pen. It will be understood that in assemblying the reservoir 21, the piston 46 is positioned within the cylinder 45 prior to the assembly of the shell 101 and the feed member 105 to the cylinder 45.

As best shown in FIG. 16 both the shell 101 and the feed member 105, which are rotatable with respect to one another, are provided with external flutes or serrations 117 and 118 to provide finger grip portions for facilitating relative rotation between the two to move the piston 46 back and forth within the chamber 44.

An important feature of the reservoir 21 is that the feed member 105 is provided with what may be termed a left-handed thread so that as the feed member 105 is rotated clockwise, relative to the shell 101, the piston 46 moves rearwardly to increase the capacity of the chamber 44. The reason for this type of thread is that the normal tendency of persons is to rotate something in a clockwise direction, whether or not they know what the effect of such rotation will be. Accordingly, a person picking up the pen 20 would in the first instance have the urge to rotate the feed member 105 clockwise which would, if the reservoir 44 were full of ink, and if a right-hand thread were user, squirt ink out of the front of the pen. However, by using the left-hand thread, when the feed member 105 is rotated clockwise, the piston 46 is retracted without the undesirable effect of squirting ink.

As shown, the forward end of the piston 46 is provided with a resilient O ring 120 received in an annular recess to insure a tight seal across the piston to prevent air from leaking past the piston 46 into the chamber 44.

In use, the reservoir 21 may be filled by immersing the nib 34 in ink while the reservoir 21 is assembled to the pen 20 or the reservoir 21 may be filled by first disassembling it from the pen and then dipping the collar 48 into a supply of ink. In both cases, the feed member 105 is rotated clockwise to withdraw the piston 46 from the forward end of the chamber 44 to the rearward end thereof thereby sucking ink up into the chamber 44.

As mentioned above the pen 20 is suitable for use with the refillable reservoir 21 and it is also adapted for used with a replaceable throw-away type ink cartridge 22 shown in FIG. 15. The throw-away cartridge 22 comprises a generally tubular plastic member 122 having a closed rearward end 123 and an open forward end 124 into which a plug 125, having a rabbet 126 is press-fitted. The plug 125 is fitted into the open end 124 after the tube 122 has been filled with ink. Thereafter, suitable means such as heat sealing is used to permanently seal the plug 125 to the tube 122. As shown, the plug 125 is provided with a forward bore 127 and a rearward bore 128 separated by a thin wall 129 which is an integral part of the plug 125.

In use, the cartridge 22 is placed over the rearwardly extending tubular portion 41 of the nipple 37 with the tube 41 extending into the bore 127. By pushing the two parts together, the sharp end 42 of the nipple 37 partially severs the wall 129 from the plug 125 and presses the wall 129 into the dotted line position shown in FIG. 15 where it is out of the way of the bore in the nipple 37, and cannot intereferre with the free flow of ink from the cartridge 22. Inasmuch as the plug 125 is slightly resilient and the diameter of the bore 127 is equal to or slightly less than the external diameter of the tube 41, an air-tight seal is provided between the nipple 37 and the plug 125. Consequently, ink cannot leak from the reservoir nor can air leak into the reservoir. Moreover, the resiliency of the collar 125 removably secures the cartridge 22 to the nipple 37.

While the present invention has been described in connection with a particular embodiment thereof, it will be understood that those skilled in the art may make many changes and modifications without departing from the true spirit and scope of the invention and the appended claims are intended to cover all such changes and modification.

We claim:

1. In a fountain pen having a reservoir, a shell having a longitudinal bore therein, a rearwardly facing annular shoulder in said bore, a generally cylindrical plug disposed in said bore, said plug having a pair of spaced outwardly directed flanges engaging said shell to axially locate said plug in said shell and to define an overflow chamber between said shell and the portion of said plug intermediate said flanges, an annular face on one of said flanges abutting said shoulder to maintain said plug at a predetermined longitudinal position in said shell, the mutually abutting surfaces of said shoulder and said flange defining a capillary space having an infinite capillary force, said space being of annular configuration and disposed at one end of said chamber, and a passageway of capillary dimension connected between said chamber at the location of said infinite capillary and the reservoir for supplying ink to said chamber.

2. In a fountain pen, the combination of an ink reservoir, a writing point, a feed bar connected between said point and said reservoir, said feed bar including capillary feed grooves extending from opposite ends to an intermediate portion, the cross-sectional dimension of said intermediate portion being less than the cross-sectional dimension of said bar at the locations bounding said intermediate portion, said grooves being unaligned and extending into said intermediate portion, a collector plug including a bore in which said feed bar is loosely fitted, said plug overlying said intermediate portion of said feed bar to define an annular weir chamber of sufficiently large dimension to permit air to bubble through ink contained therein, a collector shell enclosing said plug and forming a collector chamber between said plug and said shell, means on said shell for locating said plug with respect thereto, and a collar connected to said shell and to said feed bar for mounting said feed bar in said shell, and said plug having a radial slot of capillary thickness interconnecting said weir chamber and said collector chamber.

3. The combination set forth in claim 2 wherein said bore is cylindrical, said collector chamber includes an infinite capillary at the juncture of said plug and said shell in direct communication with said slot, and the width of said slot is less than the width of said weir chamber at the intersection of said weir chamber and said slot whereby said slot and said infinite capillary are normally filled with ink.

4. A fountain pen as set forth in claim 3 wherein said means is a tubular member threadedly engaged with said shell.

5. A fountain pen as set forth in claim 4 wherein said shell and said tubular member provide the sole support for said collector plug.

6. In a fountain pen of the type including a writing point, an ink reservoir, and a capillary feed passageway interconnecting said reservoir and said writing point; and means for inhibiting leakage of ink from said writing point comprising an elongated, hollow, collector shell forming a portion of the pen body, a generally cylindrical plug positioned in the cavity of said shell, at least a portion of the external wall of said plug being spaced from the internal wall of said shell to define a longitudinally extending annular chamber of capillary thickness, said walls of said plug and said shell meeting at one end of said chamber at a sharp, acute angle, said plug having a longitudinally extending radial slot of capillary dimension opening into the apex of said acute angle and extending annular chamber of capillary thickness, said annular chamber, said chamber communicating with said reservoir exclusively through said slot.

References Cited by the Examiner
UNITED STATES PATENTS

| | | | |
|---|---|---|---|
| 2,107,150 | 2/38 | Heising | 120—50 |
| 2,223,541 | 12/40 | Baker | 120—50 |
| 2,512,004 | 6/50 | Wing | 120—50 |
| 2,612,867 | 10/52 | Baker | 120—46 |
| 2,769,427 | 11/56 | Martin | 120—46 |
| 2,811,948 | 11/57 | Kahn et al. | 120—50 |

FOREIGN PATENTS 489,972    1/54    Italy.

JEROME SCHNALL, *Primary Examiner.*

GEORGE NINAS, JR., LAWRENCE CHARLES, L. W. VARNER, *Examiners.*

UNITED STATES PATENT OFFICE
CERTIFICATE OF CORRECTION

Patent No. 3,185,135                                          May 25, 1965

Homer T. Green et al.

It is hereby certified that error appears in the above numbered patent requiring correction and that the said Letters Patent should read as corrected below.

Column 2, line 57, for "on" read -- of --; column 6, line 57, for "chamber 7." read -- chamber 77. --; column 8, line 8, for "user" read -- used --; line 26, for "used" read -- use --; line 45, for "interefere" read -- interfere --; column 10, line 17, for "annular chamber of capillary thickness," read -- substantially throughout the length of --.

Signed and sealed this 12th day of October 1965.

(SEAL)
Attest:

ERNEST W. SWIDER                                EDWARD J. BRENNER
Attesting Officer                                      Commissioner of Patents